US009824539B2

(12) United States Patent
Marks

(10) Patent No.: US 9,824,539 B2
(45) Date of Patent: Nov. 21, 2017

(54) METHOD OF GAMING, A GAMING SYSTEM AND A GAME CONTROLLER

(71) Applicant: Aristocrat Technologies Australia Pty Limited, North Ryde (AU)

(72) Inventor: Daniel Marks, Decatur, GA (US)

(73) Assignee: Aristocrat Technologies Australia Pty Limited (AU)

( * ) Notice: Subject to any disclaimer, the term of this patent is extended or adjusted under 35 U.S.C. 154(b) by 157 days.

(21) Appl. No.: 14/821,536

(22) Filed: Aug. 7, 2015

(65) Prior Publication Data

US 2016/0042588 A1 Feb. 11, 2016

(30) Foreign Application Priority Data

Aug. 11, 2014 (AU) ................................ 2014903118

(51) Int. Cl.
*G06F 17/00* (2006.01)
*G07F 17/32* (2006.01)

(52) U.S. Cl.
CPC ........ *G07F 17/3258* (2013.01); *G07F 17/326* (2013.01); *G07F 17/3244* (2013.01)

(58) Field of Classification Search
USPC ...................................................... 463/16–25
See application file for complete search history.

(56) References Cited

U.S. PATENT DOCUMENTS

| | | | | |
|---|---|---|---|---|
| 8,562,421 B2 * | 10/2013 | Chim | G07F 17/32 | 463/10 |
| 8,721,428 B2 * | 5/2014 | Fong | G07F 17/3223 | 463/13 |
| 8,961,291 B2 * | 2/2015 | Dias Pires | G07F 17/32 | 463/16 |
| 9,028,316 B2 * | 5/2015 | Shai-Hee | G07F 17/32 | 463/16 |
| 2012/0208613 A1 * | 8/2012 | Barbalet | G07F 17/3211 | 463/11 |

* cited by examiner

*Primary Examiner* — Ronald Laneau
(74) *Attorney, Agent, or Firm* — McAndrews, Held & Malloy, Ltd.

(57) ABSTRACT

An electronic method of gaming comprises an electronic game controller forming a game outcome by selecting a plurality of symbols for display at respective ones of a plurality of symbol display positions of a symbol display, evaluating the game outcome to determine whether to a) make an award in respect of the game outcome, and b) remove one or more symbols from the symbol display, and upon removing one or more symbols, making an additional award upon the removal of the one or more symbols corresponding to one or more removal outcomes.

36 Claims, 6 Drawing Sheets

METHOD OF GAMING, A GAMING SYSTEM AND A GAME CONTROLLER

RELATED APPLICATIONS

This application claims priority to Australian Provisional Patent Application No. 2014903118 having an International filing date of Aug. 11, 2014, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In electronic gaming systems such as spinning reel or "slot" gaming machines, symbols are selected for display on a display of the machine. The displayed symbols are evaluated to determine whether an award is to be made to a player.

While such gaming systems provide players with enjoyment, a need exists for alternative gaming systems.

BRIEF SUMMARY OF THE INVENTION

In a first aspect, there is provided an electronic method of gaming comprising an electronic game controller:

forming a game outcome by selecting a plurality of symbols for display at respective ones of a plurality of symbol display positions of a symbol display;

evaluating the game outcome to determine whether to a) make an award in respect of the game outcome, and b) remove one or more symbols from the symbol display; and upon removing one or more symbols, making an additional award upon the removal of the one or more symbols corresponding to one or more removal outcomes.

In an embodiment, a removal outcome is removal of a designated symbol.

In an embodiment, a removal outcome is removal of a symbol from a designated symbol display position.

In an embodiment, the additional award is one or more game events.

In an embodiment, the one or more game events comprise a plurality of game rounds.

In an embodiment, the additional award is a credit value.

In an embodiment, the additional award is a jackpot prize.

In an embodiment, evaluating the game outcome to determine whether to remove one or more symbols from the symbol display comprises the game controller determining whether the symbol display includes a designated winning symbol combination; and upon the displayed symbols including a designated winning symbol combination removing at least symbols of the designated winning symbol combination.

In an embodiment, the method comprises the game controller selecting one or more replacement symbols and forming a second game outcome from the remaining symbols and the one or more replacement symbols.

In an embodiment, the method comprises the game controller selecting replacement symbols for each of the removed symbols.

In an embodiment, there are a plurality of designated winning combinations.

In an embodiment, the electronic game controller only makes the additional award when an ante bet has been wagered.

In a second aspect, there is provided an electronic game controller for a gaming system, the game controller arranged to:

form a game outcome by selecting a plurality of symbols for display at respective ones of a plurality of symbol display positions of a symbol display;

evaluate the game outcome to determine whether to a) make an award in respect of the game outcome, and b) remove one or more symbols from the symbol display; and upon removing one or more symbols, make an additional award upon the removal of the one or more symbols corresponding to one or more removal outcomes.

In an embodiment, a removal outcome is removal of a designated symbol.

In an embodiment, a removal outcome is removal of a symbol from a designated symbol display position.

In an embodiment, the additional award is one or more game events.

In an embodiment, the one or more game events comprise a plurality of game rounds.

In an embodiment, the additional award is a credit value.

In an embodiment, the additional award is a jackpot prize.

In an embodiment, the game controller evaluates the game outcome to determine whether to remove one or more symbols from the symbol display by determining whether the symbol display includes a designated winning symbol combination; and upon the displayed symbols including a designated winning symbol combination, the game controller removes at least symbols of the designated winning symbol combination.

In an embodiment, the electronic game controller is arranged to select one or more replacement symbols and form a second game outcome from the remaining symbols and the one or more replacement symbols.

In an embodiment, the electronic game controller is arranged to select replacement symbols for each of the removed symbols.

In an embodiment, there are a plurality of designated winning combinations.

In an embodiment, the electronic game controller is arranged to only make the additional award when an ante bet has been wagered.

In a third aspect, there is provided an electronic gaming system comprising:

a game outcome generator arranged to form a game outcome by selecting a plurality of symbols for display at respective ones of a plurality of symbol display positions of a symbol display;

a game outcome evaluator arranged to evaluate the game outcome to determine whether to a) make an award in respect of the game outcome, and b) remove one or more symbols from the symbol display;

a symbol remover arranged to remove the one or more symbols; and a symbol removal evaluator arranged to make an additional award in response to the removal of the one or more symbols corresponding to one or more removal outcomes.

In an embodiment, a removal outcome is removal of a designated symbol.

In an embodiment, a removal outcome is removal of a symbol from a designated symbol display position.

In an embodiment, the additional award is one or more game events.

In an embodiment, the one or more game events comprise a plurality of game rounds.

In an embodiment, the additional award is a credit value.

In an embodiment, the additional award is a jackpot prize.

In an embodiment, the game outcome evaluator evaluates the game outcome to determine whether to remove one or more symbols from the symbol display by determining whether the symbol display includes a designated winning symbol combination; and

- upon the displayed symbols including a designated winning symbol combination, a symbol remover removes at least symbols of the designated winning symbol combination.

In an embodiment, the game outcome generator is arranged to select one or more replacement symbols and form a second game outcome from the remaining symbols and the one or more replacement symbols.

In an embodiment, the game outcome generator is arranged to select replacement symbols for each of the removed symbols.

In an embodiment, there are a plurality of designated winning combinations.

In an embodiment, the electronic gaming system is arranged to only make the additional award when an ante bet has been wagered.

In a fourth aspect, there is provided a gaming system comprising:

- means for forming a game outcome by selecting a plurality of symbols for display at respective ones of a plurality of symbol display positions of a symbol display;
- means for evaluating the game outcome to determine whether to a) make an award in respect of the game outcome, and b) remove one or more symbols from the symbol display; and
- means for, upon removing one or more symbols, making an additional award upon the removal of the one or more symbols corresponding to one or more removal outcomes.

In a fifth aspect, there is provided computer program code which when executed by a processor:

- forms a game outcome by selecting a plurality of symbols for display at respective ones of a plurality of symbol display positions of a symbol display;
- evaluates the game outcome to determine whether to a) make an award in respect of the game outcome, and b) remove one or more symbols from the symbol display; and
- upon removing one or more symbols, makes an additional award upon the removal of the one or more symbols corresponding to one or more removal outcomes.

In a sixth aspect, there is provided a tangible computer readable medium comprising the above computer program code.

BRIEF DESCRIPTION OF SEVERAL VIEWS OF THE DRAWINGS

An exemplary embodiment of the invention will now be described with reference to the accompanying drawings in which.

DETAILED DESCRIPTION OF THE INVENTION

Figure 1:
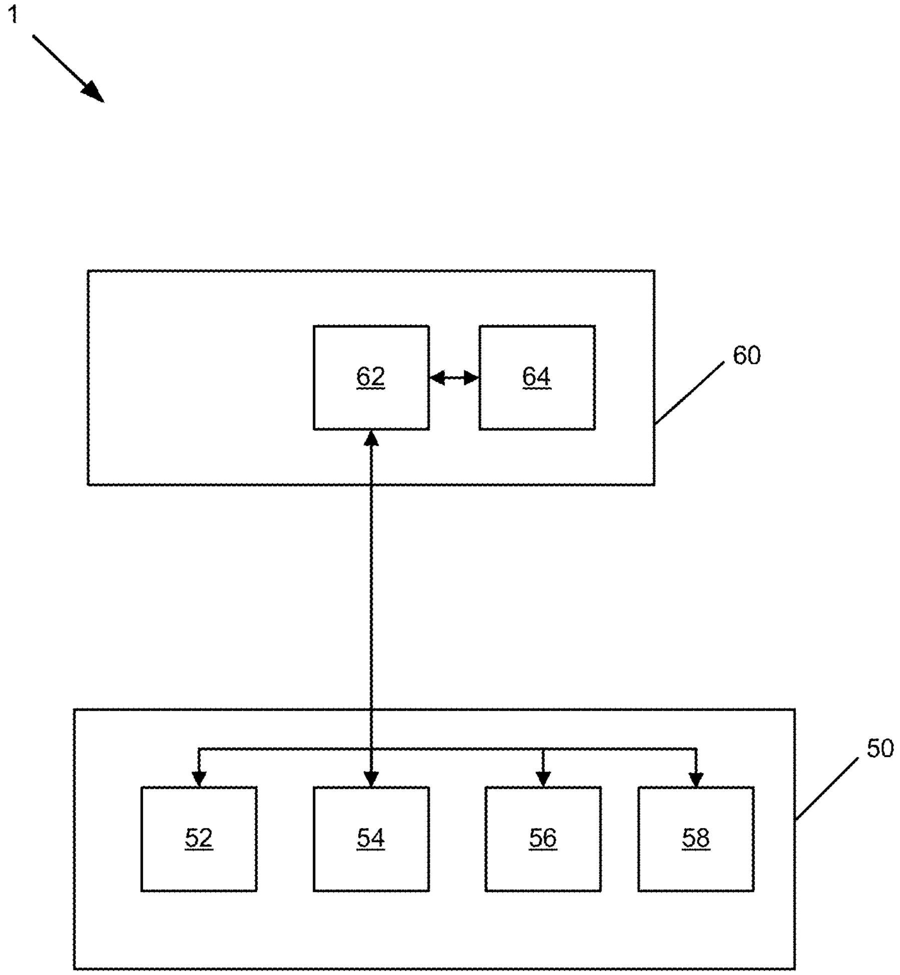
FIG. 1 is a block diagram of the core components of a gaming system.

Referring to the drawings, there is shown an embodiment of an electronic gaming system having an electronic game controller arranged to implement a game wherein a game outcome is formed by selecting symbols for display at a plurality of symbol display positions. The gaming system has components that evaluate first game outcome to determine if one or more symbols should be removed from the symbol display. Upon one or more symbols being removed, the game controller determines whether the removal process results in a removal outcome and an award is made in respect of any removal outcome. The removal outcome may be that a symbol is removed from a designated position or that a designated symbol is removed.

General Construction of Gaming System

The gaming system can take a number of different forms. In a first form, a standalone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on. Other variations will be apparent to persons skilled in the art.

Irrespective of the form, the gaming system 1 has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g. to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
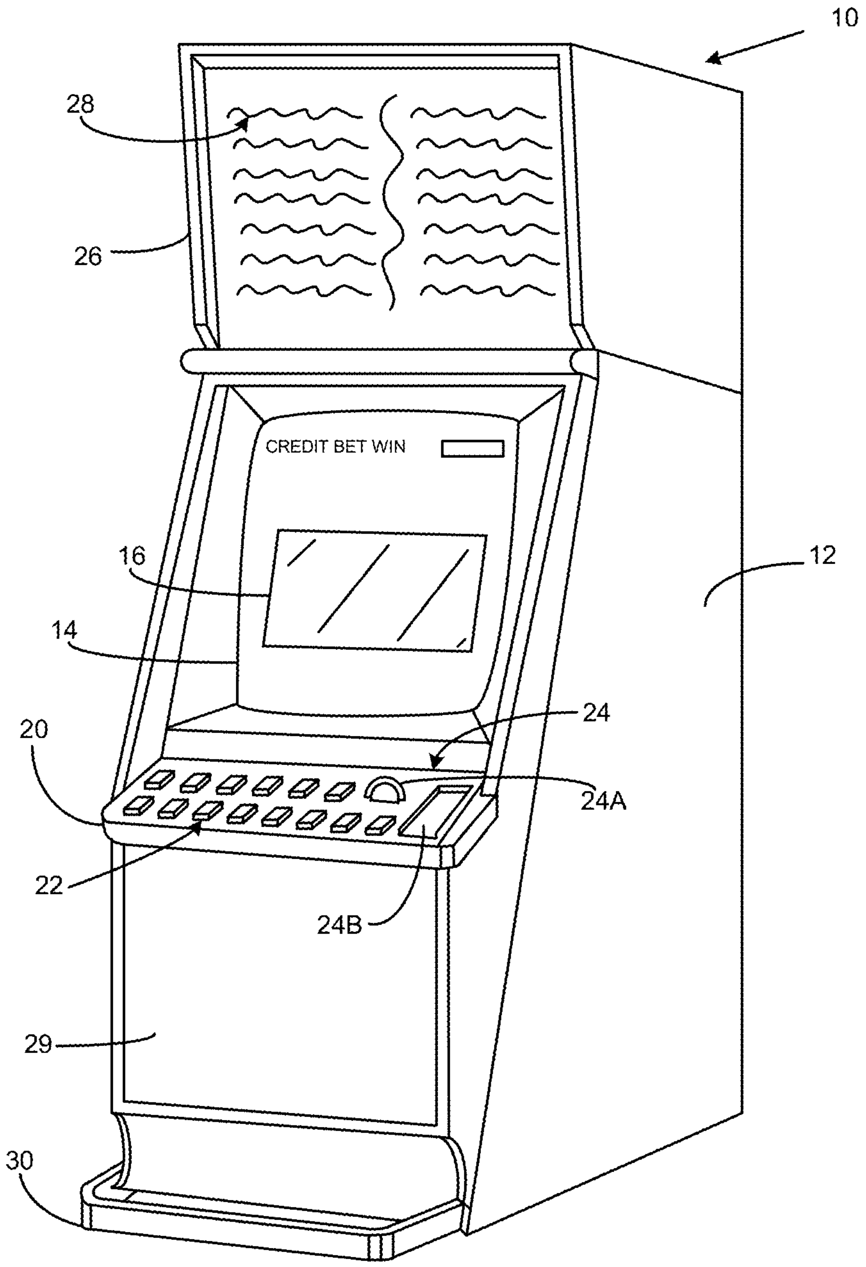
FIG. 2 is a perspective view of a standalone gaming machine.

A gaming system in the form of a standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
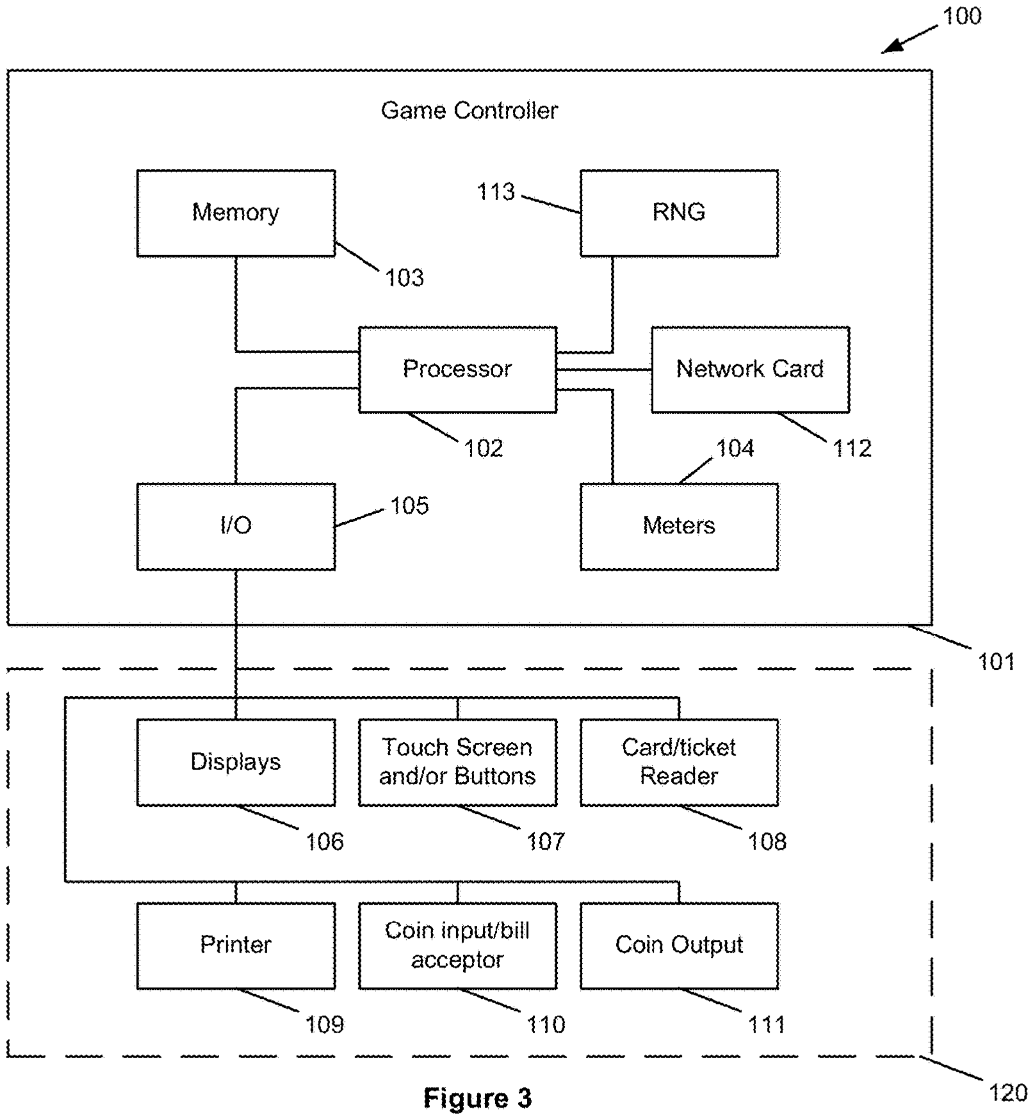
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
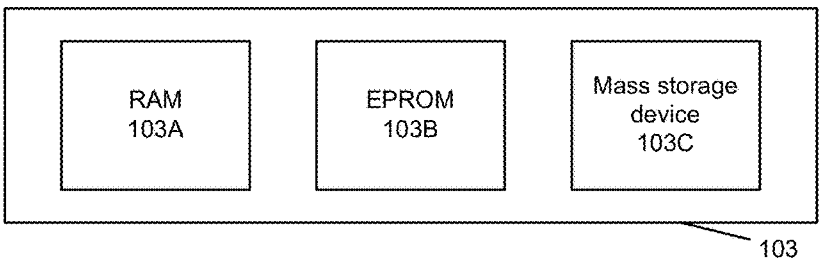
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106,107,108,109,110,111 to be provided remotely from the game controller 101.

Figure 5:
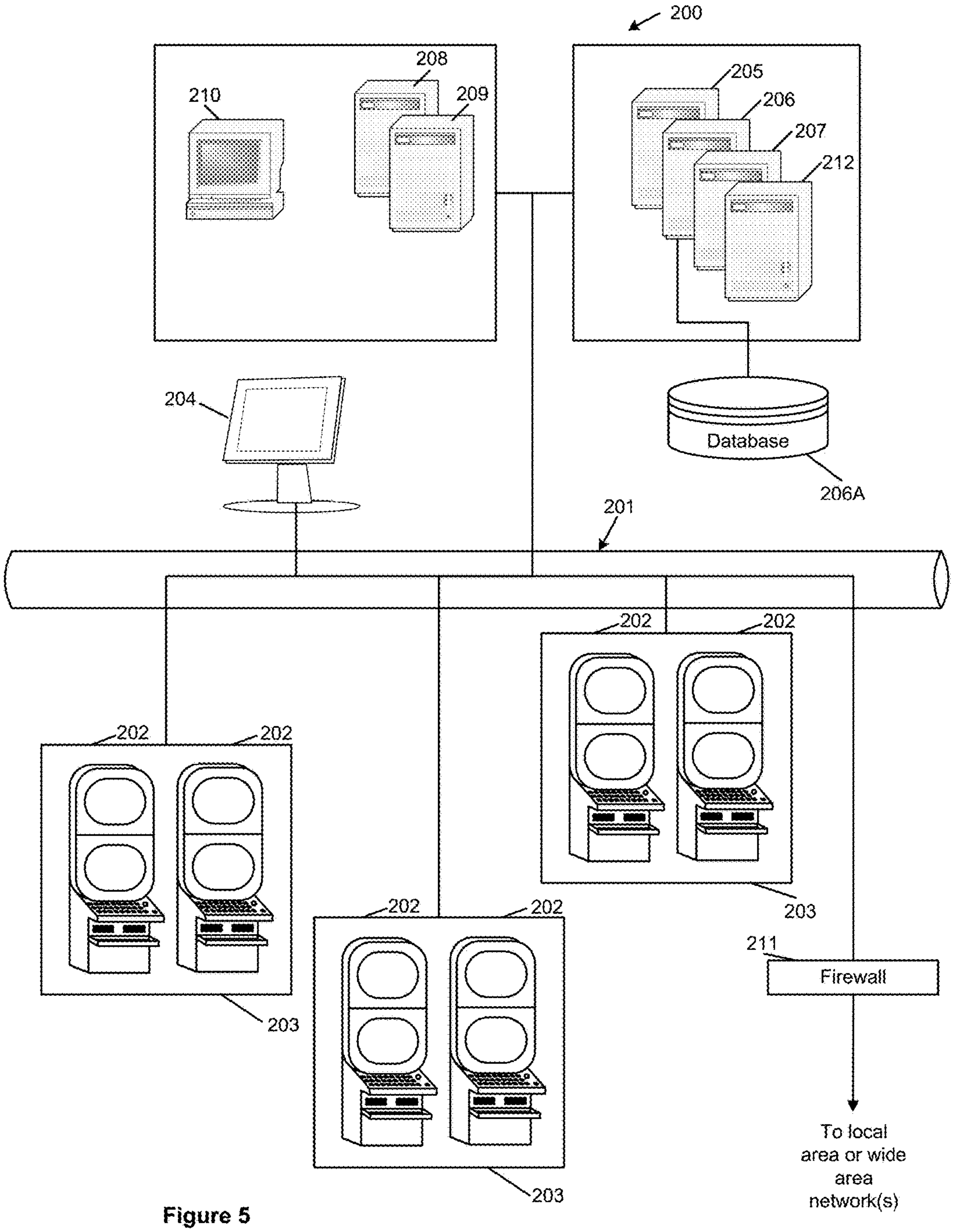
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5 are connected to the network 201. The gaming machines 202 provide a player operable interface and may be the same as the gaming machines 10,100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further Detail of Gaming System

The player operates the game play mechanism 56 to specify a wager and hence the win entitlement which will be evaluated for this play of the game and initiates a play of the game. Persons skilled in the art will appreciate that a player's win entitlement will vary from game to game dependent on player selections. In most spinning reel games, it is typical for the player's entitlement to be affected by the amount they wager and selections they make (i.e. the nature of the wager). For example, a player's win entitlement may be based on how many lines they play in each game—e.g. a minimum of one line up to the maximum number of lines allowed by the game (noting that not all permutations of win lines may be available for selection) and how much they wager per line. Such win lines are typically formed by a combination of symbol display positions, one from each reel, the symbol display positions being located relative to one another such that they form a line.

In many games, the player's win entitlement is not strictly limited to the lines they have selected, for example, "scatter" pays are awarded independently of a player's selection of paylines and are an inherent part of the win entitlement.

Persons skilled in the art, will appreciate that in other embodiments, the player may obtain a win entitlement by selecting a number of reels to play and an amount to wager per reel. Such games are marketed under the trade name "Reel Power" by Aristocrat Leisure Industries Pty Ltd. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

Figure 6:
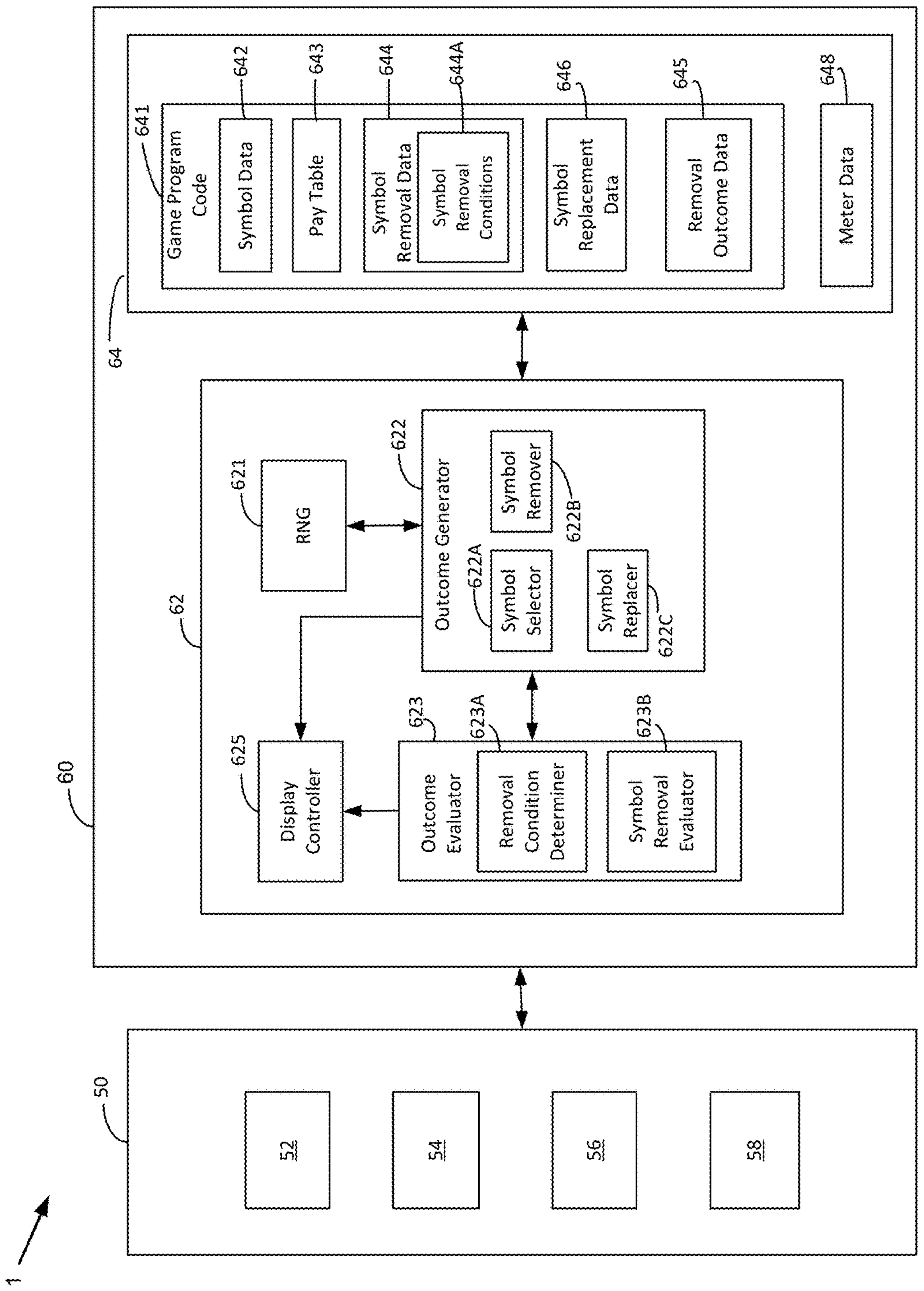
FIG. 6 is a further block diagram of a gaming system.

In FIG. 6, the processor 62 of game controller 60 of gaming system 1 is shown implementing a number of modules based on game program code 641 stored in memory 64. Persons skilled in the art will appreciate that various of the modules could be implemented in some other way, for example by a dedicated circuit in order to provide the components of the gaming system.

These modules include the outcome generator 622 which operates in response to the player's operation of game play mechanism 56 to place a wager and initiate a play of the game and generates a game outcome which will then be evaluated by outcome evaluator 623. The first part of forming the game outcome is for a symbol selector 622A to select symbols from a set of symbols specified by symbol data 641 using random number generator 621. The selected symbols are advised to the display controller 625 which causes them to be displayed as a symbol display on display 54 at a set of display positions.

In the embodiment described below, the display positions of the symbol display are arranged in a rectangular matrix comprising a plurality of columns and a plurality of rows. However, other arrangements are known in the gaming industry and could be employed in embodiments of the invention. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighbouring reel.

In one embodiment, the outcome generator 622 is arranged to generate one or more game outcomes. All outcomes are displayed on display 54 under control of display controller 625. One example of generating a first game outcome is for the symbol selector 622A to select symbols for display from symbol data 641 in the form of a plurality of symbol sets corresponding to respective ones of a plurality of reels. The symbol sets specify a sequence of symbols for each reel such that the symbol selector 622A can select all of the symbols to be displayed for each reel by selecting a stopping position in the sequence. In one example, three symbols of each of five reels may be displayed such that symbols are displayed at fifteen display positions on display 54. It is known to use a probability table stored in memory 64 to vary the odds of a particular stop position being selected. Other techniques can be used to control the odds of particular outcomes occurring to thereby control the return to player of the game.

Once the symbols are selected by the symbol selector 622A of outcome generator 622, they are evaluated by the outcome evaluator 623 to determine whether they include any winning combinations in pay table 643 to determine whether to make an award. Any award is added to the win meter maintained in memory 64 as part of meter data 648. The meter data 648 also includes the current value of a credit meter. The current values of the credit and win meters are displayed on display 54 by the display controller 625. Wins are transferred from the win meter to the credit meter at the end of a play of the game. Wagers are deducted from the credit meter when play of a game commences.

In the embodiment, the first game outcome is also evaluated by the outcome evaluator 623 to determine whether a symbol removal condition is met. To this end, outcome evaluator 623 includes a removal condition determiner 623A which determines whether the game outcome satisfies the symbol removal conditions 644A of symbol removal data 644 stored in the memory 64. In one embodiment, the symbol removal condition is that the first game outcome includes a designated symbol combination and all symbols of the winning combination are removed. In another embodiment, the symbol removal condition may be the proximity of one designated symbol to another designated symbol. The designated winning symbol combination may be all winning combinations in the pay table, a subset of the winning combinations in the pay table, or only those winning combinations which are completed using a substitute symbol, commonly known as a WILD symbol.

In one embodiment, if the removal condition determiner 623A determines that there is a designated winning symbol combination 645, it causes symbol remover 622B to carry out a symbol removal operation. In some embodiments this may be part of the formation of a second game outcome. The symbol remover 622B carries out the symbol removal operation in accordance with the rules specified by symbol removal data 644. In embodiments of the invention, each symbol removal operation carried out in respect of a designated winning symbol combination 645 involves removal of the designated winning symbol combination. In some embodiments one or more other, non-winning symbols may be removed.

In embodiments of the invention, the symbol removal outcome evaluator 623B determines whether the removal of the symbols corresponds to a removal outcome of removal outcome data 645 and hence whether a "reward" will be "revealed". Upon the removal outcome occurring, an additional award is made by the outcome evaluator 623.

Depending on the embodiment, additional awards may be in the form of credit values, free spins, and/or progressive jackpots are revealed when symbols are removed from the symbol displayed.

The revealed rewards may be generated in any suitable manner. In one embodiment, rewards are generated in relation to the amount of the ante bet such that placing the ante bet activates the feature of providing award in response to removal and a higher ante bet produces rewards of higher value.

Alternative embodiments may include: any number of revealed rewards; any value of revealed reward; any type of revealed reward; any method of activating the revealed reward feature (e.g. part of base bet, max bet); and any method of generating revealed rewards (e.g. associating with a symbol or symbol position).

In an embodiment of the invention, removed symbols are replaced with replacement symbols by symbol replacer 622C to form a second game outcome. In this respect, FIG. 6 shows the symbol replacer 622C as separate to the symbol selector 622A to indicate that the process of replacing symbols need not be the same as the process for selecting symbols. However, in the some embodiments, especially those where the symbol replacement process is the same as the symbol selection process, there need not be a symbol replacer 622C but instead the outcome generator 622 could cause the symbol selector 622A to replace symbols such that the symbol selector also acts as the symbol replacer.

In embodiments of the invention, the outcome evaluator 623 evaluates the second outcome to determine whether to make an award. In some embodiments, this evaluation is also based on pay table 643.

In some embodiments, the designated symbol combination matcher 623A also determines whether the symbols of the second outcome correspond to any of the designated winning symbol combinations 645. In such embodiments, it is possible for there to be a number of cycles of removal and replacement of symbols such that there may be a number of game rounds.

It will be appreciated that in some embodiments, the removal and replacement of symbols may only occur during part of the game, such as during a feature game. In other embodiments, the symbol removal and replacement may occur in both the base and the feature games. Outcomes may be generated in the feature game in the same manner as in a base game or differently.

Figure 7:
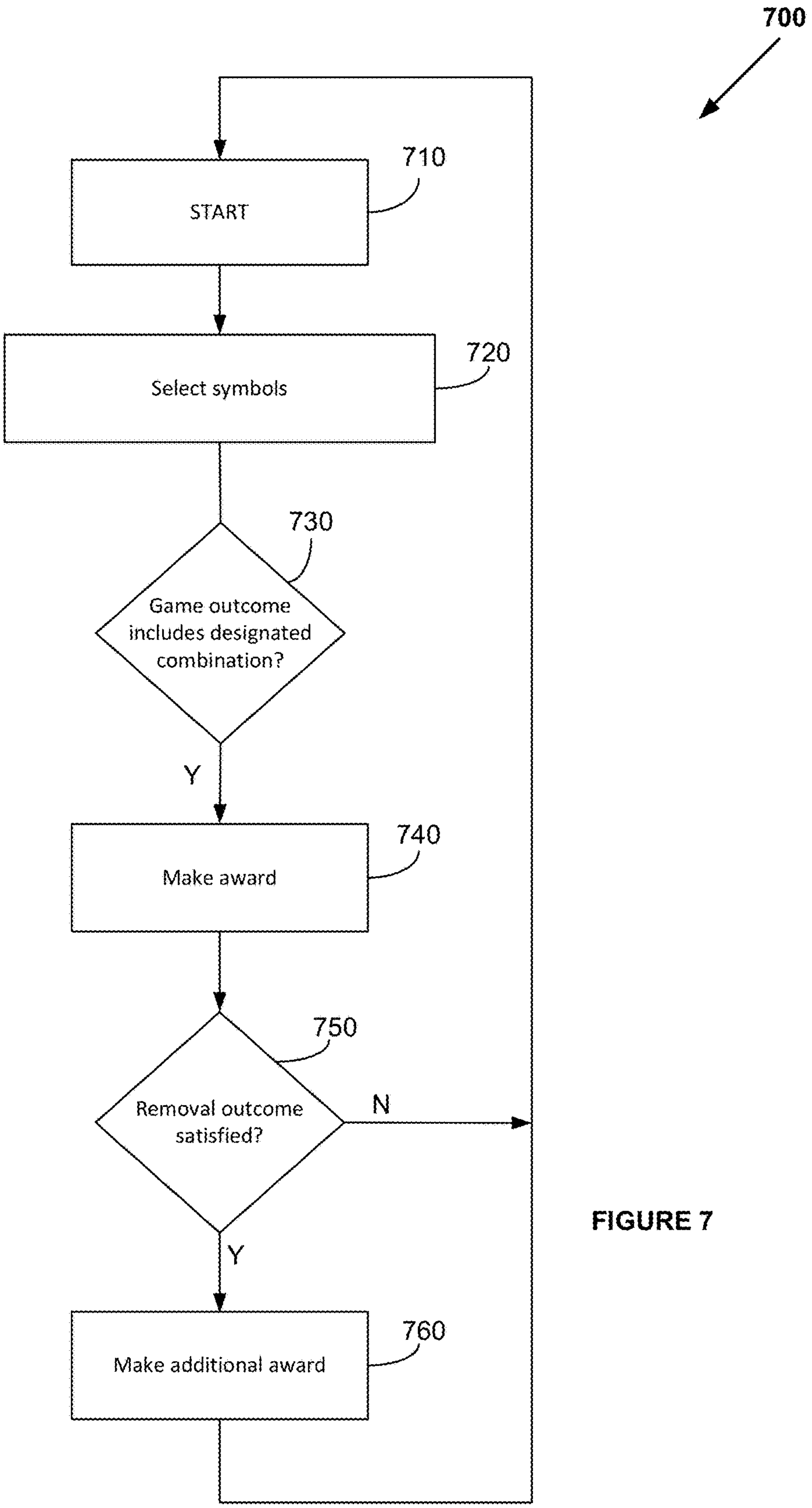
FIG. 7 is a flow chart of an embodiment.

Referring to FIG. 7, there is shown a method 700 of an embodiment of the invention. In the method 700, after game play starts 710, the method involves the game controller selecting symbols 720. It is then determined by the game controller whether a game outcome includes a designated winning combination 730. If there is a winning combination, an award is made 740 by the game controller. It is then determined by the game controller whether symbols are to be removed 750 based on whether a removal outcome occurs. If symbols are removed, an additional award is made 760 by the game controller.

It will be understood to persons skilled in the art of the invention that many modifications may be made without departing from the spirit and scope of the invention, in particular it will be apparent that certain features of embodiments of the invention can be employed to form further embodiments. For example, depending on the embodiment, different numbers of symbols may be removed from the symbol display.

Depending on the embodiment, the symbol removal data 644 may specify different rules for the location or nature of any additional non-winning symbols removed from the symbol display. For example, all non-winning symbols on the same row or payline as a winning symbol of the designated symbol combination 645 may be removed.

There may also be effects of removed symbols upon the position remaining symbols in the symbol display. For example, remaining symbols may stay in position or may adjust their location after removal of the removed.

Any suitable method may be used to display replacement of removed symbols. For example, replacement symbols may appear in the symbol display by appearing, spinning, dropping from top, rising from bottom, or sliding in from side of symbol display.

Depending on the embodiment, different methods of determining replacement symbols may be used. For example, replacement symbols may be symbols: from the same reel strips used in the initial spin (e.g. to generate a first game outcome); from different reels strips used in the initial spin; from weighted tables; from random generation from a set of symbols; from one or more pre-determined symbol scripts such that the game controller selects that replacement symbol based on a defined order of replacement symbols.

In some embodiments, an eligibility criteria may be applied for the player to access the symbol removal and/or the additional award feature for example that the player has made a certain sized wager, made an ante bet, selected all win lines, played sufficient games, or the player is a member of a loyalty program.

Depending on the embodiment, symbol removal and/or revealing of additional awards may occur in either one or both of the base game and a feature game. The base game is a part of the game which is carried out each time the player makes a wager, typically irrespective of the wager, whereas typically the feature game the game will only be carried out occasionally for example if a condition is met such as a trigger.

The trigger event for a feature game may be, a symbol combination in the game, occurrence of a specific symbol in the game, purchased, be caused by another connected system, based on turnover, based on a random evaluation, etc.

EXAMPLE

In one example, a gaming or "slot" machine has a symbol display comprised of 3 rows by 5 columns defining 15 symbol positions arranged in a rectangular matrix, with one symbol displayed in each symbol position, evaluates a sub-set of outcomes as "winning" and provides an award for each such winning outcome in accordance with an award schedule specified by pay table 643. When a player wagers an ante bet an additional award may be revealed by the gaming machine responsive to removal of the symbols.

For example, a designated winning symbol outcome ("X-X-X") appears in the 3-row by 5-column symbol display shown below and generates a 10-credit award based upon the pay schedule for X-X-X symbol combinations.

| | | | | |
|---|---|---|---|---|
| X | X | X | A | A |
| C | D | A | F | A |
| B | E | F | G | C |

Following the issuance of awards for any such winning outcome, the gaming machine removes all of the symbols of the winning outcome along with any other symbols appearing in the columns in which the winning outcomes appear.

For example, following the 10-credit award, the X-X-X symbols are removed from the symbol display. The gaming machine also determines whether a removal outcome has been satisfied in respect of the removal of any one or more of these symbols and the display indicates in respect of each position whether an additional award will be made. In this case, the removal outcome is that the symbol has been removed from the third position of the first row and hence an additional award has been made. Below, the "-" indicium indicates no award whereas the "$" indicium indicates that an award will be made.

| | | | | |
|---|---|---|---|---|
| — | — | $ | A | A |
| C | D | A | F | A |
| B | E | F | G | C |

The gaming machine then replaces all of the symbols removed from the symbol display with new symbols. For example, new A, C, and D symbols are introduced on row 1 as shown below.

| | | | | |
|---|---|---|---|---|
| A | C | D | A | A |
| C | D | A | F | A |
| B | E | F | G | C |

The gaming machine then re-evaluates winning symbol outcomes, if any, and repeats the process until no designated winning symbol outcomes appear in the symbol display.

Further aspects of the method will be apparent from the above description of the system. It will be appreciated that at least part of the method will be implemented electronically, for example, digitally by a processor executing program code such as in the above description of a game controller. In this respect, in the above description certain steps are described as being carried out by a processor of a gaming system, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art will appreciate that program code provides a series of instructions executable by the processor.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An electronic method of gaming for use with a gaming machine having a credit input mechanism operable to receive a physical item representing a monetary value for establishing a credit balance, the credit balance being increasable and decreasable based at least on wagering activity, hardware meters operable to monitor the credit balance, a memory storing a plurality of symbols, a symbol display having a plurality of symbol display positions, a payout mechanism, and a game controller, the method comprising:

forming a game outcome, said forming including selecting, via the game controller, in accord with the established credit balance, a plurality of symbols from the memory for display;

displaying the selected symbols of the game outcome at the plurality of symbol display positions of the symbol display;

evaluating, via the game controller, the game outcome to determine whether to a) make an award in respect of the selected symbols, and b) remove at least one of the selected symbols from the game outcome at the plurality of symbol display positions of the symbol display that results in making the award;

removing the at least one of the selected symbols from the plurality of symbol display positions in response to said evaluating that results in making the award;

making, via the game controller, an additional award in response to the removal of the at least one of the selected symbols, said making including increasing the credit balance; and providing a payout via the payout mechanism based on the credit balance.

2. A method as claimed in claim 1, wherein the removing of the at least one of the selected symbols corresponds to a removal outcome, the removal outcome is a removal of a designated symbol.

3. A method as claimed in claim 1, wherein the removing of the at least one of the selected symbols corresponds to a removal outcome, the removal outcome is a removal of a symbol from a designated symbol display position.

4. A method as claimed in claim 1, wherein the additional award is one or more game events.

5. A method as claimed in claim 4, wherein the one or more game events comprise a plurality of game rounds.

6. A method as claimed in claim 1, wherein the additional award is a credit value.

7. A method as claimed in claim 1, wherein the additional award is a jackpot prize.

8. A method as claimed in claim 1, wherein evaluating the game outcome to determine whether to remove at least one of the selected symbols from the game outcome at the plurality of symbol display positions that results in making the award comprises the game controller:

determining whether the symbol display includes a designated winning symbol combination; and upon the displayed symbols including a designated winning symbol combination removing at least symbols of the designated winning symbol combination.

9. A method as claimed in claim 1, comprising the game controller selecting one or more replacement symbols and forming a second game outcome from the remaining symbols and the one or more replacement symbols.

10. A method as claimed in claim 9, comprising the game controller selecting replacement symbols for each of the removed symbols.

11. A method as claimed in claim 8, wherein there are a plurality of designated winning combinations.

12. A method as claimed in claim 1, wherein the electronic game controller only makes the additional award when an ante bet has been wagered.

13. An electronic game controller for a gaming machine having a credit input mechanism operable to receive a physical item representing a monetary value for establishing a credit balance, the credit balance being increasable and decreasable based at least on wagering activity, hardware meters operable to monitor the credit balance, a memory storing a plurality of symbols, a symbol display having a plurality of symbol display positions, a payout mechanism, the game controller configured to:

form a game outcome said forming including selecting, in accord with the established credit balance, a plurality of symbols from the memory for display;

cause the display to display the selected symbols of the game outcome at the plurality of symbol display positions of the symbol display;

evaluate the game outcome to determine whether to a) make an award in respect of the selected symbols, and b) remove at least one of the selected symbols from the game outcome at the plurality of symbol display positions of the symbol display that results in making the award;

remove the at least one of the selected symbols from the plurality of symbol display positions in response to said evaluating that results in making the award;

make an additional award in response to the removal of the at least one of the selected symbols, said making including increasing the credit balance; and cause a payout to be provided via the payout mechanism based on the credit balance.

14. An electronic game controller as claimed in claim 13, wherein the removing of the at least one of the selected symbols corresponds to a removal outcome, the removal outcome is a removal of a designated symbol.

15. An electronic game controller as claimed in claim 13, wherein the removing of the at least one of the selected symbols corresponds to a removal outcome, the removal outcome is a removal of a symbol from a designated symbol display position.

16. An electronic game controller as claimed in claim 13, wherein the additional award is one or more game events.

17. An electronic game controller as claimed in claim 16, wherein the one or more game events comprise a plurality of game rounds.

18. An electronic game controller as claimed in claim 13, wherein the additional award is a credit value.

19. An electronic game controller as claimed in claim 13, wherein the additional award is a jackpot prize.

20. An electronic game controller as claimed in claim 13, wherein the game controller evaluates the game outcome to determine whether to remove at least one of the selected symbols from the game outcome at the plurality of symbol display positions that results in making the award by determining whether the symbol display includes a designated winning symbol combination; and upon the displayed symbols including a designated winning symbol combination, the game controller removes at least symbols of the designated winning symbol combination.

21. An electronic game controller as claimed in claim 13, arranged to select one or more replacement symbols and form a second game outcome from the remaining symbols and the one or more replacement symbols.

22. An electronic game controller as claimed in claim 21, arranged to select replacement symbols for each of the removed symbols.

23. An electronic game controller as claimed in claim 20, wherein there are a plurality of designated winning combinations.

24. An electronic game controller as claimed in claim 13, arranged to only make the additional award when an ante bet has been wagered.

25. An electronic gaming machine comprising:

a credit input mechanism operable to receive a physical item representing a monetary value for establishing a credit balance, the credit balance being increasable and decreasable based at least on wagering activity;

hardware meters operable to monitor the credit balance;

a memory storing a plurality of symbols, a symbol display having a plurality of symbol display positions, a payout mechanism;

a game outcome generator configured to, in accord with the established credit balance, form a game outcome said forming including selecting a plurality of symbols for display from the memory;

a display controller configured to causes the display to display the selected symbols of the game outcome at the plurality of symbol display positions of the symbol display;

a game outcome evaluator configured to evaluate the game outcome to determine whether to a) make an award in respect of the selected symbols, and b) remove at least one of the selected symbols from the game outcome at the plurality of symbol display positions of the symbol display that results in making the award;

a symbol remover configured to remove the at least one of the selected symbols from the plurality of symbol display positions in response to said evaluating that results in making the award; and a symbol removal evaluator configured to make an additional award in response to the removal of the at least one of the selected symbols, said making including increasing the credit balance; and a payout mechanism configured to provide a payout based on the credit balance.

26. An electronic gaming system as claimed in claim 25, wherein the removing of the at least one of the selected symbols corresponds to a removal outcome, the removal outcome is a removal of a designated symbol.

27. An electronic gaming system as claimed in claim 25, wherein the removing of the at least one of the selected symbols corresponds to a removal outcome, the removal outcome is a removal of a symbol from a designated symbol display position.

28. An electronic gaming system as claimed in claim 25, wherein the additional award is one or more game events.

29. An electronic gaming system as claimed in claim 28, wherein the one or more game events comprise a plurality of game rounds.

30. An electronic gaming system as claimed in claim 25, wherein the additional award is a credit value.

31. An electronic gaming system as claimed in claim 25, wherein the additional award is a jackpot prize.

32. An electronic gaming system as claimed in claim 25, wherein the game outcome evaluator evaluates the game outcome to determine whether to remove at least one of the selected symbols from the game outcome at the plurality of symbol display positions by determining whether the symbol display includes a designated winning symbol combination; and upon the displayed symbols including a designated winning symbol combination, a symbol remover removes at least symbols of the designated winning symbol combination.

33. An electronic gaming system as claimed in claim 25, wherein the game outcome generator is arranged to select one or more replacement symbols and form a second game outcome from the remaining symbols and the one or more replacement symbols.

34. An electronic gaming system as claimed in claim 33, wherein the game outcome generator is arranged to select replacement symbols for each of the removed symbols.

35. An electronic gaming system as claimed in claim 32, wherein there are a plurality of designated winning combinations.

36. An electronic gaming system as claimed in claim 25, arranged to only make the additional award when an ante bet has been wagered.

* * * * *